United States Patent
Smith

(10) Patent No.: US 11,984,712 B2
(45) Date of Patent: *May 14, 2024

(54) POWER CABLE JACKET REMOVAL DEVICE AND METHODS OF REMOVING A JACKET FROM A CABLE

(71) Applicant: MILWAUKEE ELECTRIC TOOL CORPORATION, Brookfield, WI (US)

(72) Inventor: Adam Vernon Smith, Ponder, TX (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/055,159

(22) Filed: Nov. 14, 2022

(65) Prior Publication Data
US 2023/0070686 A1    Mar. 9, 2023

Related U.S. Application Data

(63) Continuation of application No. 16/516,087, filed on Jul. 18, 2019, now Pat. No. 11,539,193, which is a continuation of application No. 14/605,581, filed on Jan. 26, 2015, now Pat. No. 10,404,044.

(51) Int. Cl.
*H02G 1/12* (2006.01)

(52) U.S. Cl.
CPC .................. *H02G 1/1297* (2013.01)

(58) Field of Classification Search
CPC ...... H02G 1/1297; H02G 1/12; H02G 1/1248; H02G 1/1251; H02G 1/126; H02G 1/1081; H02G 1/1243; H02G 1/1217; H02G 1/1239; H02G 1/1204; H02G 1/1226; H02G 1/081

USPC .......................................................... 81/9.51
See application file for complete search history.

(56) References Cited

U.S. PATENT DOCUMENTS

| | | |
|---|---|---|
| 3,686,982 A | 8/1972 | Bull |
| 3,774,478 A | 11/1973 | Carpenter et al. |
| 4,736,502 A | 4/1988 | Barnes |
| 5,074,169 A * | 12/1991 | Matz .................... H02G 1/1297 81/9.51 |
| 5,230,260 A | 7/1993 | Bell |
| 5,956,852 A * | 9/1999 | Tarpill ................. H02G 1/1226 30/90.1 |
| 6,311,600 B1 | 11/2001 | Lo et al. |
| 6,401,570 B1 | 6/2002 | Nadeau |
| 8,544,364 B2 | 10/2013 | Michaels |
| 2008/0210654 A1 | 9/2008 | Kataoka |
| 2012/0311866 A1 | 12/2012 | Jones et al. |
| 2013/0000128 A1 | 1/2013 | Johnston |
| 2013/0032654 A1 | 2/2013 | Tracey et al. |
| 2014/0262663 A1 | 9/2014 | Draganovic et al. |

* cited by examiner

*Primary Examiner* — Hadi Shakeri
(74) *Attorney, Agent, or Firm* — Michael Best & Friedrich LLP

(57) ABSTRACT

A cable jacket removal device is used to selectively remove a sheath from a length of a sheathed cable. The cable jacket removal device includes a support frame, a drive shaft, and a motor. The support frame removably couples the removal device to the cable to be stripped. The drive shaft is coupled to the support frame. The motor is coupled to the drive shaft to selectively rotate the drive shaft to cause the removal device to travel along the cable to automatically remove a cable jacket from a predefined distance of the cable.

19 Claims, 5 Drawing Sheets

POWER CABLE JACKET REMOVAL DEVICE AND METHODS OF REMOVING A JACKET FROM A CABLE

CROSS-REFERENCE TO RELATED APPLICATIONS

This application is a continuation of U.S. patent application Ser. No. 16/516,087, filed on Jul. 18, 2019, now U.S. Pat. No. 11,539,193, which is a continuation of U.S. patent application Ser. No. 14/605,518, filed on Jan. 26, 2015, now U.S. Pat. No. 10,404,044, the entire contents of both of which are incorporated herein by reference.

BACKGROUND

The field of the invention relates generally to sheathed cables and more particularly systems and methods for automatically removing a cable jacket from a sheathed cable.

Electrical cables, such as underground cables, are more commonly used to transfer electrical energy from power sources, such as a power grid, a power plant, and/or a generator. Other cables may be used to transfer an electrical signal from one location to another. Such cables often include thick conductive cores surrounded by a network of minor conductors and an insulating material such as rubber. The conductors and internal insulation are then encased by a rigid insulation layer known as a cable jacket that facilitates the prevention of interference caused by direct contact with the cable, and that shields the cable from the environment. The combination of the rigidity of the cable jacket and the materials surrounding the core of the cables may make such cables unwieldy and/or difficult to bend or to reshape.

SUMMARY

When such cables need to be cut or spliced, at least a portion of the cable jacket is removed to expose the interior of the cable. Some known cable-stripping methods use a blade configuration (e.g., a circular saw) to cut through the cable jacket. However, cutting through the cable jacket using a blade may increase the risk of damaging the interior of the cable if the blade undesirably cuts too deep. Some known cable jackets, such as those fabricated from rubber, may prematurely wear out blades, thus limiting the useful life of the blade, and increasing the amount of maintenance and potential down time. Some known cable-stripping methods require a removal device that is stationary and/or unwieldy, and as such, use of the device may be limited.

Other known methods of removing a cable jacket from a cable may be labor intensive. Manual cable-stripping may be tedious, time-consuming, and/or cost-inefficient. Moreover, the cable to be stripped may extend through an area that is not easily accessible for a user. Other known cable-stripping methods requiring manual operation may require the user to focus on operating the cable jacket removal device rather than other necessary tasks such as inspecting the cable and/or monitoring the surrounding area for any potential problems during the cable-stripping operation.

BRIEF DESCRIPTION

In one aspect, a method is provided for removing a cable jacket from a length of cable using a cable jacket removal device. The method includes coupling a support frame to the cable, attaching a drive shaft to the support frame, and coupling a motor to the support frame and to the drive shaft. The support frame removably couples the removal device to a sheathed cable. The drive shaft is attached to the support frame such that the drive shaft is selectively rotatable. The motor selectively rotates the drive shaft to cause the removal device to travel along the cable to automatically remove a cable jacket from a predefined distance of cable.

In another aspect, a cable jacket removal device is provided for use with a sheathed cable. The cable jacket removal device includes a support frame, a drive shaft, and a motor. The support frame removably couples the removal device to the cable to be stripped. The drive shaft is coupled to the support frame. The motor is coupled to the drive shaft to selectively rotate the drive shaft to cause the removal device to travel along the cable to automatically remove a cable jacket from a predefined distance of the cable.

In another aspect, a cable jacket removal device is provided for use with a sheathed cable. The cable jacket removal device includes a support frame, a drive shaft, and a motor. The support frame removably couples the removal device to the cable to be stripped. The drive shaft is coupled to the support frame. The motor is coupled to the drive shaft to selectively rotate the drive shaft to cause the removal device to travel along the cable to automatically remove a cable jacket from a predefined distance of the cable.

The features, functions, and advantages described herein may be achieved independently in various embodiments of the present disclosure or may be combined in yet other embodiments, further details of which may be seen with reference to the following description and drawings.

DETAILED DESCRIPTION

Exemplary cable jacket removal systems and more particularly, cable jacket removal devices that may be used in a cable jacket removal system are described herein. In one embodiment, the cable jacket removal device includes a support frame, a drive shaft, and a motor. In such an embodiment, the support frame is coupled to a sheathed cable to be stripped, the drive shaft is coupled to the support frame, and the motor is coupled to the drive shaft to selectively rotate the drive shaft. During use, when a wire of the cable to be stripped is coupled to the drive shaft, the cable jacket removal device draws the wire through a cable jacket of the cable to forcibly tear the cable jacket such that the cable jacket is automatically removed from a predefined distance of the cable without using a cable-stripping operation that uses a blade configuration.

As used herein, an element of step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
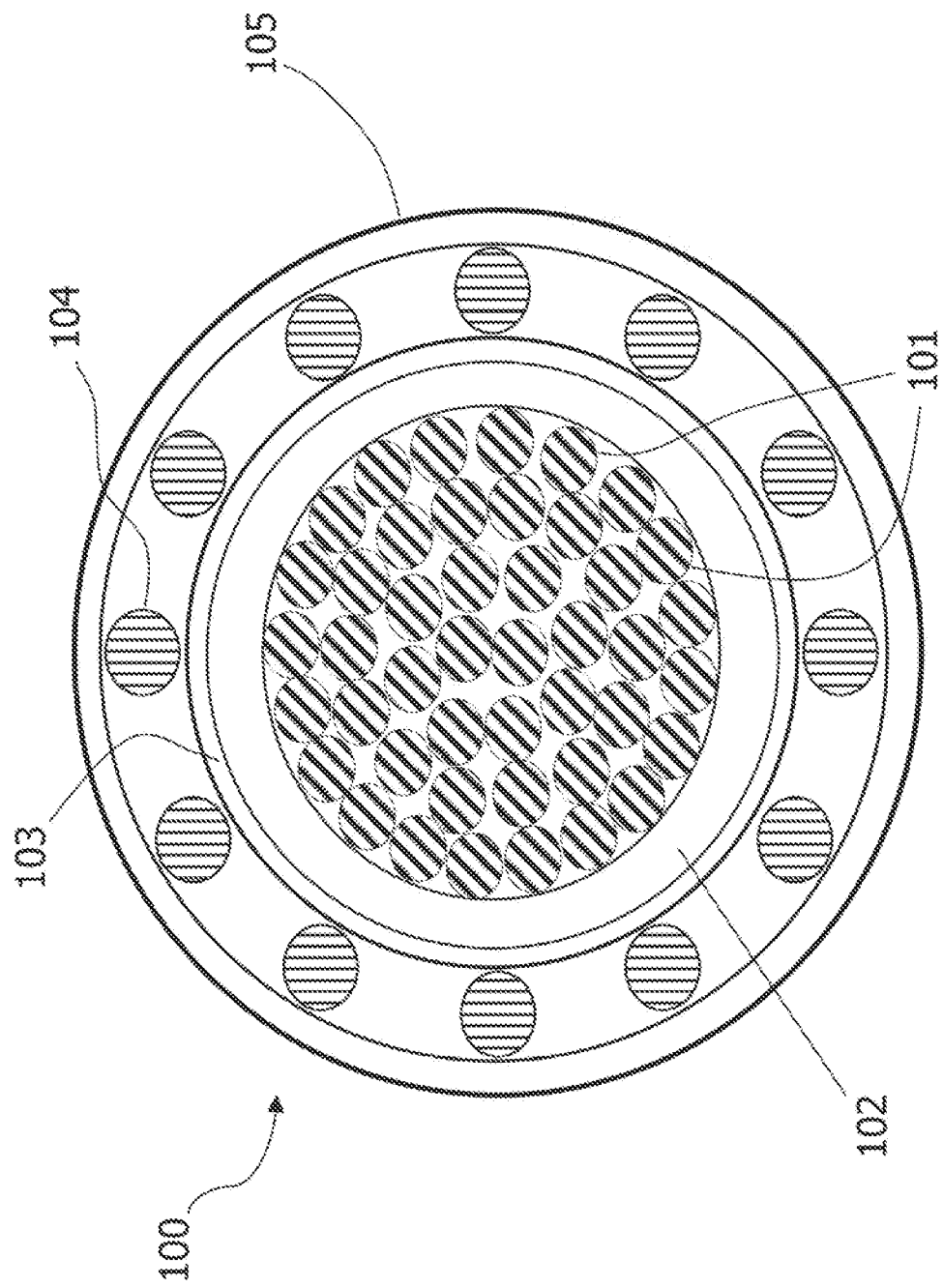
FIG. 1 is a cross-sectional view of an exemplary cable.

FIG. 1 is a cross-sectional view of an exemplary cable 100. In the example embodiment, cable 100 includes a plurality of conductors 101, an electrical insulator 102, a protective coating 103, a plurality of wires 104, and a cable jacket 105. Cable 100 is a sheathed cable that may vary in size depending on load and voltage requirements. In the exemplary embodiment, cable 100 is an underground cable. In some embodiments, cable 100 may include a single conductor 101. In the exemplary embodiment, conductors 101 are coupled together in a helical formation. Alternatively, conductors 101 may be coupled together in a different formation. Electrical insulator 102 is circumferentially coupled to conductors 101. Protective coating 103 is coupled between electrical insulator 102 and wires 104.

Wires 104 are coupled between protective coating 103 and cable jacket 105 to provide structural support and to facilitate additional conductivity for cable 100. In other embodiments, cable 100 may include a single wire 104. Alternatively, cable 100 may include any number of wires 104. In the exemplary embodiment, wires 104 are arranged in a helical formation that extends the full length of cable 100. Alternatively, wires 104 may be arranged in any other formation. Cable jacket 105 facilitates the prevention of inadvertent electrical contact with cable 100.

Figure 2:
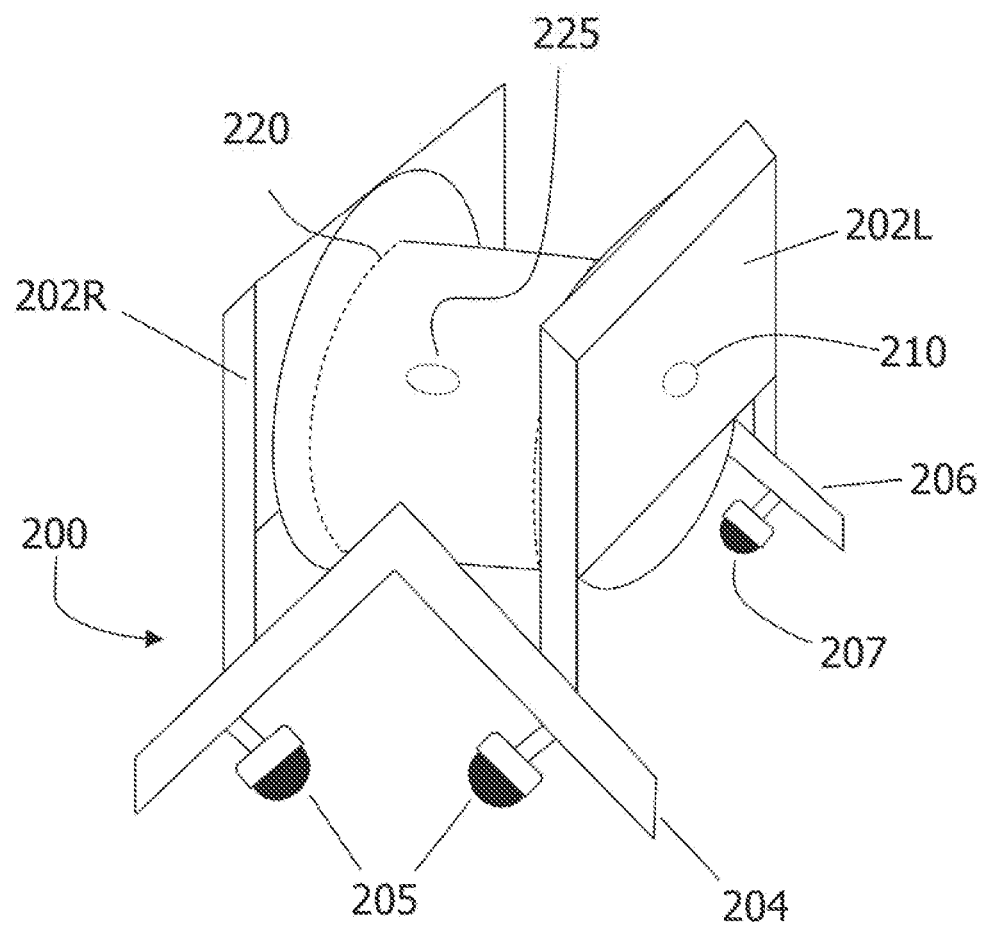
FIG. 2 is a perspective view of a portion of an exemplary cable jacket device, including a support frame, a drive shaft, and a take-up reel, that may be used to remove a cable jacket from a sheathed cable.

FIG. 2 is a perspective view of a portion of an exemplary cable jacket removal device 300 (not shown in FIG. 2). Specifically, FIG. 2 illustrates a support frame 200, a drive shaft 210, and a take-up reel 220 that may be used with cable jacket removal device 300. In the exemplary embodiment, support frame 200 includes a pair of opposed support beams 202L and 202R, a front frame 204, and a rear frame 206. Support frame 200 couples removal device 300 to cable 100 (shown in FIG. 1) such that removal device 300 may move along cable 100. Support beams 202L and 202R enable other components, such as drive shaft 210, to be coupled to support frame 200 as described in more detail below.

Front frame 204 and rear frame 206 each include respective guide members 205 and 207. In some embodiments, front frame 204 and/or rear frame 206 also includes an adjustable secondary frame (not shown) that provides additional stability to removal device 300 when removal device 300 is coupled to cable 100. The adjustable secondary frame may include at least one guide member (not shown). In the exemplary embodiment, frames 204 and 206 are each coupled to support beams 202L and 202R and each may include any number of guide members 205 and 207. Guide members 205 and 207 may be adjustable when coupled to frames 204 and 206, such that removal device 300 may be coupled to cables with different diameters. Guide members 205 and 207 are movably coupled to cable 100 to enable removal device 300 to automatically move along a length of cable 100 to be stripped. In the exemplary embodiment, guide members 205 and 207 are caster balls. Alternatively, guide members 205 and 207 may be ball bearings, wheels, and/or any other component capable of coupling removal device 300 to cable 100 such that removal device 300 may move along cable 100. In some embodiments, guide members 205 and 207 are selectively energized.

Drive shaft 210 extends through support beams 202L and 202R such that drive shaft 210 is rotatably coupled to support frame 200. Take-up reel 220 is fixedly secured to drive shaft 210 such that take-up reel 220 rotates with drive shaft 210. Take-up reel 220 includes at least one connection 225 that enables removal device 300 to be securely coupled to a wire 104 (shown in FIG. 1) from cable 100.

Figure 3:
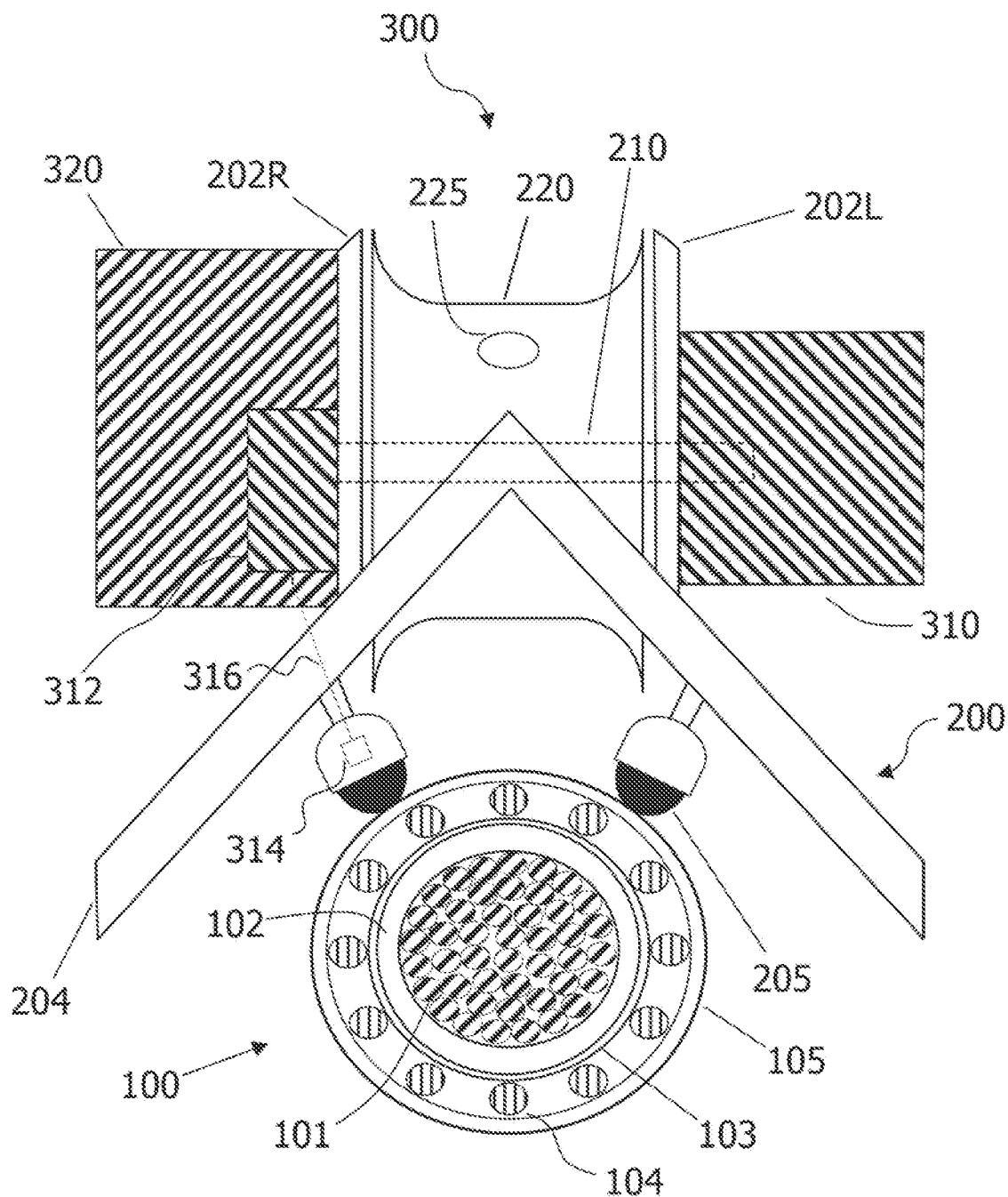
FIG. 3 is a cross-sectional front view of the removal device shown in FIG. 2 and coupled to the cable shown in FIG. 1.

FIG. 3 is a cross-sectional front view of cable jacket removal device 300 coupled to cable 100. In the exemplary embodiment, removal device 300 includes support frame 200, drive shaft 210, take-up reel 220, a motor 310, and a power supply 320. Guide members 205 and 207 (not shown in FIG. 3) are coupled to cable 100 to enable removal device 300 to move along cable 100.

In the exemplary embodiment, motor 310 includes a control box 312 that controls operation of motor 310. Control box 312 and power supply 320 are electrically coupled to motor 310 to enable power to be supplied to motor 310. Control box 312 is a separate component that is communicatively coupled to motor 310. In some embodiments, control box 312 is wirelessly coupled to motor 310. Alternatively, motor 310 may include integrated controls. Control box 312 may be coupled to support frame 200, motor 310, and/or power supply 320. In the exemplary embodiment, control box 312 is coupled to support frame 202R and power supply 320.

Motor 310 is coupled to drive shaft 210 such that drive shaft 210 is rotated when motor 310 is engaged. In the exemplary embodiment, energizing motor 310 automatically engages motor 310. Alternatively, energizing motor 310 may not automatically engage motor 310 (e.g., a neutral gear). In the exemplary embodiment, motor 310 is also coupled to support beam 202L of support frame 200. Alternatively, motor 310 may be coupled to frames 204 and 206 (not shown in FIG. 3) and/or support beam 202R.

Motor 310 also includes a sensor 314 and a user interface (not shown). In the exemplary embodiment, sensor 314 is in communication with control box 312 and the user interface is integrated in control box 312. In other embodiments, sensor 314 is integrated in motor 310. Sensor 314 identifies an event (e.g., the proximity of a stop band 400 shown in FIG. 4) and transmits a signal to control box 312 through a communication line 316. Alternatively, sensor 314 may transmit a signal to motor 310 and/or control box 312 through wireless communication. In the exemplary embodiment, sensor 314 is coupled to one of guide members 205. In other embodiments, sensor 314 may be coupled in an alternative location of removal device 300 to facilitate sensor 314 identifying an event.

The user interface provides a user with control options for motor 310 to enable a user to selectively control motor operations such as power, motor engagement, motor speed, and/or rotation direction. In some embodiments, a remote device that includes a user interface (such as, but not limited to, a smartphone, a tablet, or a dedicated remote) may be communicatively coupled to motor 310 to enable remote control of removal device 300.

Motor 310 may be operable using direct current (DC) power or alternating current (AC) power. In some embodiments, motor 310 includes electrical circuit (not shown) to filter, to convert, and/or to regulate incoming power.

Power supply 320 is electrically coupled to motor 310 to enable power to be provided to motor 310. In some embodiments, removal device 300 includes a plurality of power supplies 320. In the exemplary embodiment, power supply 320 is coupled to support beam 202R of support frame 200. Alternatively, power supply 320 may be coupled to frames 204 and 206 (not shown in FIG. 3) and/or support beam 202L. In other embodiments, power supply 320 is integrated in motor 310. In another embodiment, power supply 320 is replaced by an external power supply that is electrically coupled to motor 310. Power supply 320 may also include an interface (not shown) to facilitate control of operation of power supply 320 such as controlling the connection of power supply 320 to motor 310 or an external power supply for charging.

Figure 4:
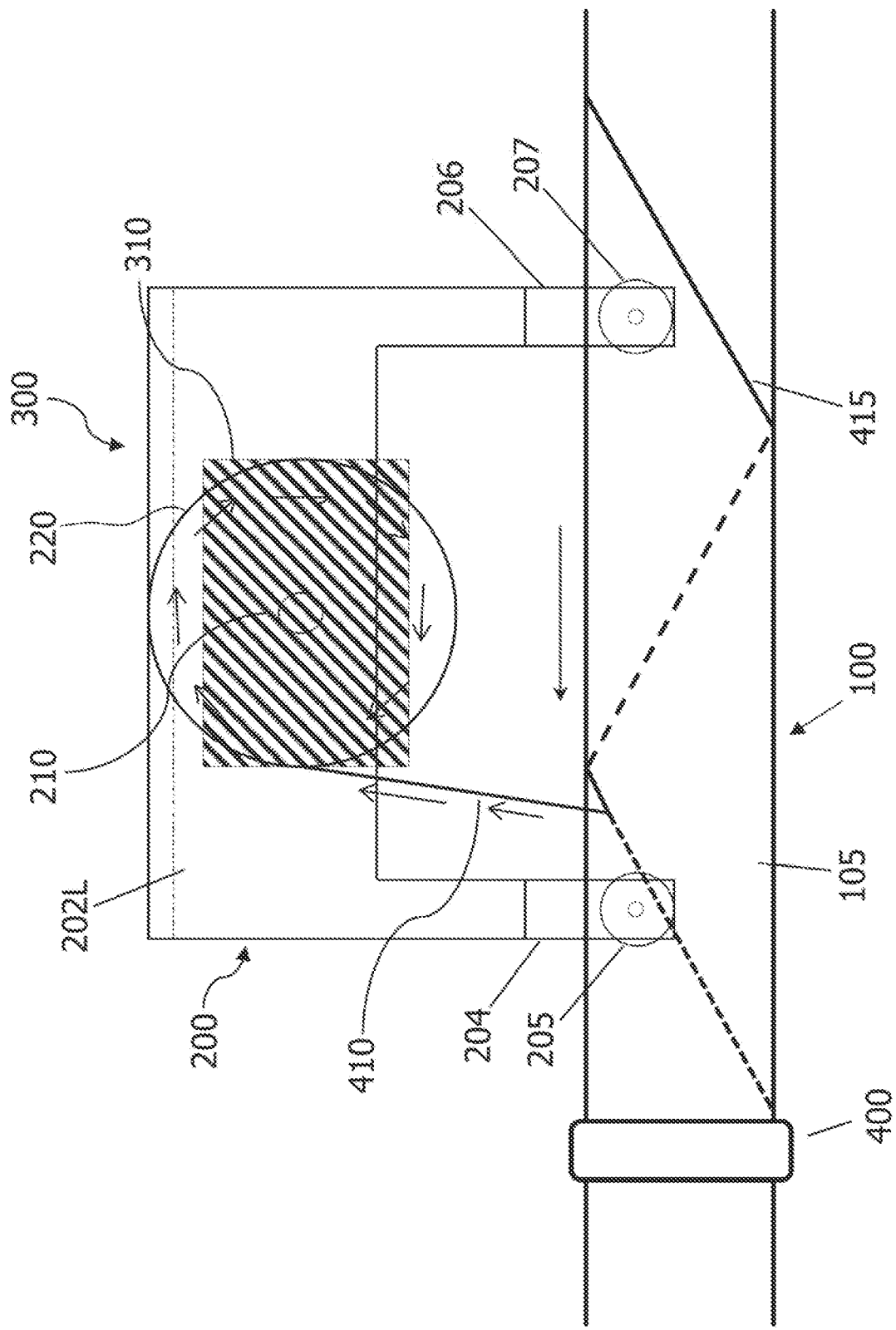
FIG. 4 is a side view of the removal device shown in FIG. 3 during a cable-stripping operation.

FIG. 4 is a side view of removal device 300 coupled to cable 100 and in the process of removing cable jacket 105 from cable 100. In the exemplary embodiment, removal device 300 also includes a stop band 400. In other embodiments, removal device 300 does not include stop band 400 but rather the user may selectively energize and deenergize the operation of removal device 300. Stop band 400 is coupled to cable 100 at a distance away from removal device 300 that defines the length of cable 100 to be stripped between removal device 300 and stop band 400. The length of cable 100 defined between device 300 and stop band 400 may vary according to a user's requirements. Stop band 400 may include subcomponents (not shown) designed to communicate with removal device 300 to disengage motor 310. Such subcomponents may include a radio frequency identification (RFID) tag, a near-field communication (NFC) device, and/or a mechanical trigger. In some embodiments, stop band 400 provides visual indication for a user to disengage motor 310.

During use, in the exemplary embodiment shown in FIGS. 2-4, removal device 300 and stop band 400 are coupled to cable 100 to define the length of cable 100 to be stripped. A wire 410 of wires 104 is exposed and coupled to connection 225. A user (not shown) energizes and engages motor 310 to cause the drive shaft 210 and take-up reel 220 to rotate. The rotation of take-up reel 220 draws wire 410 to forcibly tear cable jacket 105. An opposing force, in combination with guide members 205 and 207, pulls removal device along the length of cable 100 to be stripped. Removal device 300 automatically continues to draw wire 410 along cable 100 until stop band 400 is reached. Sensor 314 senses the proximity of stop band 400 and signals motor 310 to disengage. In the exemplary embodiment, the helical configuration of wire 410 results in a helical tear 415 in cable jacket 105. Tear 415 enables the user to remove cable jacket 105 from cable 100.

Figure 5:
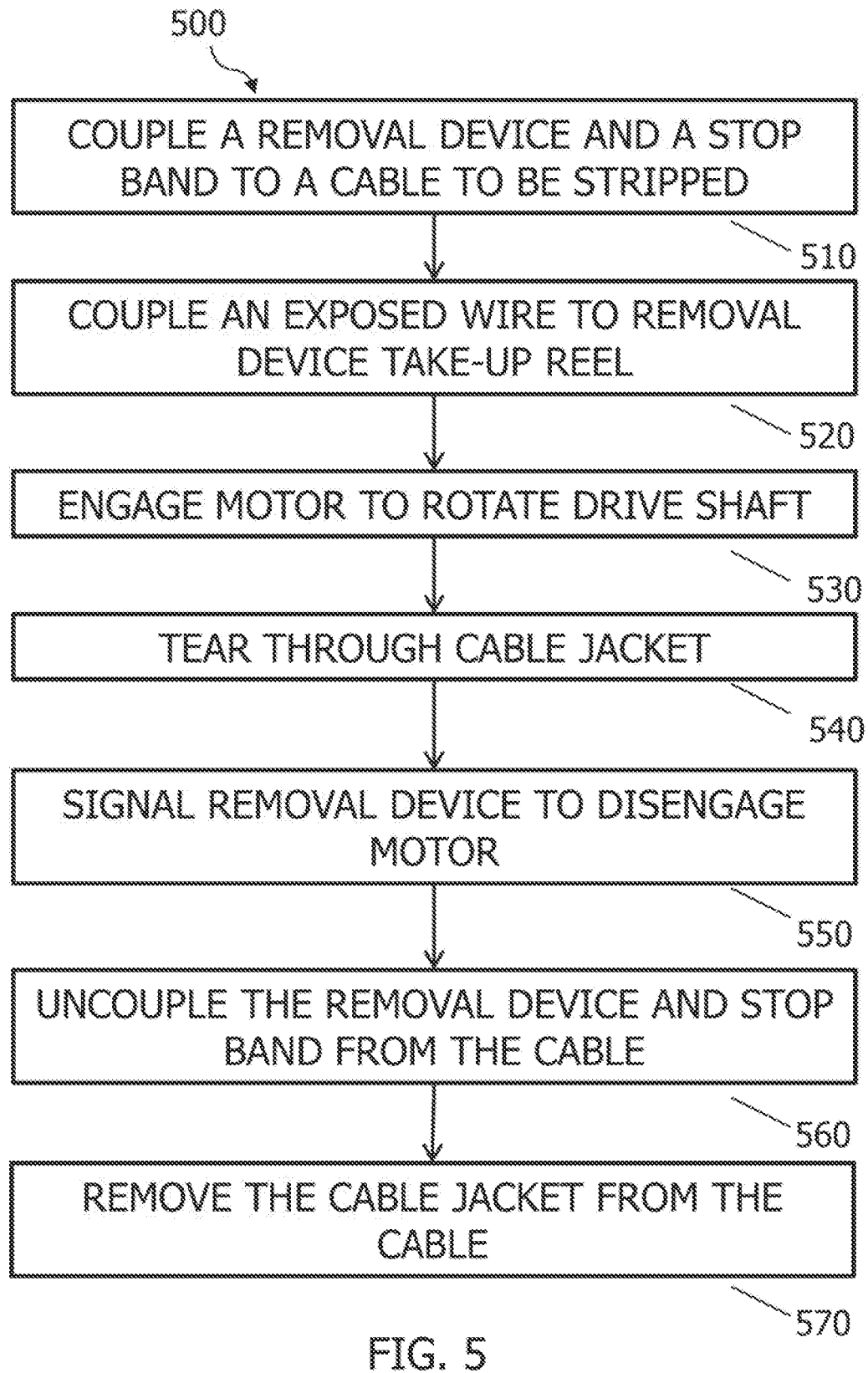
FIG. 5 illustrates a flow diagram of an exemplary process that may be implemented to remove a cable jacket from a sheathed cable using the removal device shown in FIGS. 2-4.

FIG. 5 illustrates a flow diagram of an exemplary process 500 that may be implemented to remove a portion of cable jacket 105 (shown in FIG. 1) from a cable 100 (shown in FIG. 1) using removal device 300 (shown in FIG. 4). Initially, a user couples 510 a removal device and a stop band to a cable; the position of the stop band relative to the removal device defines a length of cable to be stripped. A wire is exposed and is then coupled 520 to the device take-up reel. The user then engages 530 the motor to cause the drive shaft to rotate. As described above, the take-up reel rotates with the drive shaft to enable the take-up reel to draw the exposed wire away from the cable along the length of cable being stripped. As the exposed wire is drawn by the reel, the removal device is transitioned automatically along the cable towards the stop band. More specifically, the exposed wire is drawn or pulled with enough force to forcibly tear 540 through cable jacket 105.

The removal device automatically continues pulling the exposed wire and thus tearing 540 cable jacket 105. When the removal device has traveled approximately the length of cable 100 to be stripped, the removal device is signaled 550 to disengage the motor to stop pulling the exposed wire. Removal device 300 and the stop band are each uncoupled 560 from cable 100. In some embodiments, the exposed wire is cut from cable 100 to be uncoupled with the removal device. In other embodiments, the exposed wire is unwound from the take-up reel. Cable jacket 105 is removed 570 to allow the user to cut or splice the interior of cable 100.

The exemplary embodiments described herein facilitate removing a cable jacket from a desired length of a cable without the use of a blade or blade configuration. Pulling an internal wire from the cable through the cable jacket facilitates reducing the risk of damaging the interior of the cable as the internal wire is selected from a group of wires adjacent the cable jacket. Additionally, the exemplary embodiments described facilitate lessening the possibility of maintenance of the cable jacket removal device as the cable jacket is torn by an internal wire instead of a blade or blade configuration.

Moreover, the embodiments described provide an automatic removal device that is capable of on-site use. The automatic removal device described in the exemplary embodiments facilitates increasing the productivity of a user during a cable-stripping operation by reducing the attention required to operate the removal device. In addition, the automatic removal device described in the exemplary embodiments facilitates eliminating fatigue associated with manual cable-stripping methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cable jacket removal device for use with a sheathed cable, the device comprising:
   a support frame configured to support a power supply and including a front guide member and a rear guide member, the front guide member and the rear guide member configured to be positioned on the sheathed cable;
   a take-up reel supported by the support frame, the take-up reel supported separately from the front guide member and the rear guide member, the take-up reel including a first end, a second end opposite the first end, and an axis extending through the first end and the second end of the take-up reel, the take-up reel rotatable about the axis;
   a motor supported by the support frame and located at the first end of the take-up reel, the motor configured to be operably coupled to the power supply and operable to rotate the take-up reel; and
   a remote device in wireless communication with the motor;
   wherein the remote device is configured to send a first signal to the motor to activate the motor to rotate the take-up reel, the support frame configured to traverse the cable as the take-up reel rotates and winds the wire onto itself thereby ripping a sheath of the cable; and
   wherein the remote device is configured to send a second signal to the motor to deactivate the motor and stop rotation of the take-up reel.

2. The cable jacket removal device of claim 1, wherein each of the front guide member and rear guide member is adjustable to accommodate a variable diameter of the cable.

3. The cable jacket removal device of claim 1, wherein the support frame includes a front frame that supports the front guide member, and a rear frame that supports the rear guide member.

4. The cable jacket removal device of claim 3, wherein the take-up reel is positioned between the front frame and the rear frame.

5. The cable jacket removal device of claim 1,
wherein the front guide member is a first front guide member that is configured to be positioned on a first side of the cable, and further comprising a second front guide member configured to be positioned on a second side of the cable,
wherein the rear guide member is a first rear guide member that is configured to be positioned on the first side of the cable, and further comprising a second rear guide member configured to be positioned on the second side of the cable.

6. The cable jacket removal device of claim 1, wherein the remote device is a smartphone, a tablet, or a dedicated remote.

7. The cable jacket removal device of claim 1, wherein the first signal is a forward signal, the forward signal configured to activate the motor to rotate the take-up reel in a first rotation direction, causing the support frame to traverse the cable in a first direction, and
wherein the remote actuator is configured to send a third signal, which is a reverse signal, the reverse signal configured to activate the motor to rotate the take-up reel in a second rotation direction, thereby unwinding the wire from the take-up reel.

8. The cable jacket removal device of claim 1, wherein the support frame includes a front frame that supports the front guide member, and a rear frame that supports the rear guide member, and wherein the take-up reel is positioned between the front frame and the rear frame.

9. A cable jacket removal device for use with a sheathed cable, the device comprising:
a support frame configured to support a power supply and including a front guide member and a rear guide member, the front guide member and the rear guide member configured to be positioned on the sheathed cable;
a take-up reel supported by the support frame, the take-up reel supported separately from the front guide member and the rear guide member;
a motor supported by the support frame, the motor configured to be operably coupled to the power supply and operable to rotate the take-up reel; and
a sensor in communication with the motor;
wherein the motor is configured to receive a first signal to activate the motor, the support frame configured to roll along the cable as the take-up reel spools the wire onto itself thereby ripping a sheath of the cable; and
wherein the sensor is configured to identify an event while the frame is rolling along the cable and, in response, generate a second signal, and wherein the motor is configured to receive the second signal to deactivate the motor and stop rotation of the take-up reel.

10. The cable jacket removal device of claim 9, wherein the event includes proximity of a stop band, the sensor configured to detect the stop band that is coupled to sheathed cable at a stop location to generate the second signal.

11. The cable jacket removal device of claim 10, wherein the sensor is configured to communicate with the stop band using one selected from a group consisting of a radio frequency identification (RFID) tag, a near-field communication (NFC) device, and a mechanical trigger.

12. The cable jacket removal device of claim 9, further comprising a remote device in wireless communication with the motor, and wherein the remote device is configured to send the first signal to the motor to activate the motor to rotate the take-up reel.

13. The cable jacket removal device of claim 12, wherein the remote device is configured to send a third signal to the motor to deactivate the motor and stop rotation of the take-up reel.

14. The cable jacket removal device of claim 12, wherein the remote device is a smartphone, a tablet, or a dedicated remote.

15. The cable jacket removal device of claim 12, wherein the event includes proximity of a stop band, the sensor configured to detect the stop band that is coupled to sheathed cable at a stop location to generate the second signal.

16. The cable jacket removal device of claim 15, wherein the sensor is configured to communicate with the stop band using one selected from a group consisting of a radio frequency identification (RFID) tag, a near-field communication (NFC) device, and a mechanical trigger.

17. The cable jacket removal device of claim 15, wherein the remote device is configured to send a third signal to the motor to deactivate the motor and stop rotation of the take-up reel.

18. The cable jacket removal device of claim 17, wherein the first signal is a forward signal, the forward signal configured to activate the motor to rotate the take-up reel in a first rotation direction, causing the support frame to traverse the cable in a first direction, and
wherein the remote actuator is configured to send a fourth signal, which is a reverse signal, the reverse signal configured to activate the motor to rotate the take-up reel in a second rotation direction, thereby unwinding the wire from the take-up reel.

19. A cable jacket removal device for use with a sheathed cable, the sheathed cable defining a longitudinal axis, the device comprising:
a support frame configured to support a power supply and including a front guide member and a rear guide member, the front guide member and the rear guide member substantially aligned with one another and configured to be positioned on a first portion of the sheathed cable, the first portion being defined by a cross-section through a length of the cable jacket sheathed cable;
a take-up reel supported by the support frame;
a motor supported by the support frame, the motor configured to be operably coupled to the power supply and operable to rotate the take-up reel; and
wherein the support frame is configured to be supported on the first portion of the sheathed cable via the front guide member and the rear guide member,
wherein the motor is configured to:
receive a first remote signal to activate the motor, the support frame configured to roll along the cable as the take-up reel spools the wire onto itself thereby ripping a sheath of the cable; and
receive a second remote signal to deactivate the motor, wherein the support frame includes a front frame that supports the front guide member, and a rear frame that supports the rear guide member, and wherein the take-up reel is positioned between the front frame and the rear frame.

* * * * *